(12) United States Patent
Borghi

(10) Patent No.: US 10,005,410 B2
(45) Date of Patent: Jun. 26, 2018

(54) IMPACT ABSORBING DEVICE DEFINING APERTURE

(71) Applicant: Faraday & Future Inc., Gardena, CA (US)

(72) Inventor: Cory D. Borghi, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days. days.

(21) Appl. No.: 15/273,957

(22) Filed: Sep. 23, 2016

(65) Prior Publication Data

US 2017/0088074 A1 Mar. 30, 2017

Related U.S. Application Data

(60) Provisional application No. 62/234,737, filed on Sep. 30, 2015.

(51) Int. Cl.
*B60R 19/18* (2006.01)
*B60K 11/08* (2006.01)

(52) U.S. Cl.
CPC ............. *B60R 19/18* (2013.01); *B60K 11/08* (2013.01); *B60R 2019/182* (2013.01); *B60R 2019/186* (2013.01); *B60Y 2306/01* (2013.01)

(58) Field of Classification Search
CPC ............ B60R 19/18; B60R 2019/1806; B60R 2019/182; B60R 2019/186; B60R 2019/1866; B60R 2019/188; B60K 11/08
See application file for complete search history.

(56) References Cited

U.S. PATENT DOCUMENTS

| 3,694,018 A | * | 9/1972 | Levering | B60R 19/18 267/140 |
| 3,917,332 A | * | 11/1975 | Puleo | B60R 19/18 293/109 |
| 5,066,057 A | * | 11/1991 | Furuta | B60R 19/18 293/121 |
| 5,080,411 A | * | 1/1992 | Stewart | B60R 19/18 293/102 |
| 7,866,716 B2 | | 1/2011 | Perucca et al. | |
| 2005/0046226 A1 | * | 3/2005 | White | B21D 26/055 296/102 |
| 2006/0255602 A1 | | 11/2006 | Evans | |
| 2008/0217934 A1 | * | 9/2008 | Hori | B60R 19/18 293/102 |
| 2009/0066096 A1 | | 3/2009 | Doroghazi et al. | |
| 2009/0115206 A1 | * | 5/2009 | Demange | B60R 19/18 293/120 |

(Continued)

*Primary Examiner* — Gregory A Blankenship
(74) *Attorney, Agent, or Firm* — Lee & Hayes PLLC

(57) ABSTRACT

An impact absorbing device may include a support beam with a first side and a second side opposite the first side. The first side may be designed to be closer to a passenger compartment of a vehicle than the second side. The support beam may also define a first aperture extending through the support beam from the first side to the second side. The impact absorbing device may also include an energy absorbing member associated with the second side of the support beam, which may defines a second aperture that is substantially aligned with the first aperture of the support beam. The first and second apertures may be configured to provide flow communication through the impact absorbing device.

11 Claims, 12 Drawing Sheets

(56) References Cited

U.S. PATENT DOCUMENTS

| | | | |
|---|---|---|---|
| 2010/0013249 A1* | 1/2010 | Karlander | B60R 19/18 293/132 |
| 2010/0102577 A1* | 4/2010 | Ginja | B60R 19/34 293/102 |
| 2010/0127520 A1* | 5/2010 | Ginja | B60R 19/12 293/146 |
| 2010/0127533 A1* | 5/2010 | Gonin | B60R 19/12 296/193.09 |
| 2011/0115241 A1* | 5/2011 | Gonin | B60R 19/03 293/120 |
| 2011/0121586 A1* | 5/2011 | Gonin | B60R 19/12 293/132 |
| 2011/0308121 A1* | 12/2011 | Rossi | B29C 43/021 40/559 |
| 2013/0193698 A1* | 8/2013 | Nagwanshi | B60R 19/18 293/120 |
| 2014/0084608 A1* | 3/2014 | Hasegawa | B60R 19/12 293/132 |
| 2014/0312636 A1* | 10/2014 | Corwin | B60R 21/34 293/133 |
| 2017/0088074 A1* | 3/2017 | Borghi | B60R 19/18 |
| 2017/0144618 A1* | 5/2017 | Martini | B60R 19/18 |

\* cited by examiner

IMPACT ABSORBING DEVICE DEFINING APERTURE

CROSS-REFERENCE TO RELATED APPLICATIONS

This application claims the benefit of U.S. Provisional Application No. 62/234,737, filed on Sep. 30, 2015. The subject matter of the aforementioned application is incorporated herein by reference.

TECHNICAL FIELD

The present disclosure is directed to an impact absorbing device defining an aperture for use in a vehicle.

BACKGROUND

In both the United States and Europe, safety regulations require vehicles to include front and rear impact absorbing devices, such as bumpers. These impact absorbing devices may be designed to protect both the vehicle and pedestrians in case of an accident. Because of their safety function, impact absorbing devices are regulated. For example, standards such as FMVHS pt. 581 (49 C.F.R. § 581), in the United States, and ECE Reg. 42, in Europe, dictate the positioning of impact absorbing devices on the chassis of a vehicle, and impose safety standards.

In addition to hosting the impact absorbing devices, the chassis or body of a vehicle must provide a route for air to reach components associated with the chassis, such as a primary power source (for an electric vehicle, a fuel cell vehicle, a hybrid vehicle, or a conventional internal combustion engine vehicle), a vehicle cooling system, a transmission, an oil cooler, a radiator, or other components known in the art. Traditionally vehicle manufacturers have designed vehicles so that this air flow passes over or under a bumper, in order to meet safety standards and provide the necessary air flow. This configuration may limit the cooling and/or design options available to vehicle designers and manufacturers.

The disclosed impact absorbing device is directed to addressing one or more of the possible drawbacks discussed above and/or other problems of the prior art.

SUMMARY

In one aspect the disclosure relates to an impact absorbing device for a vehicle. The impact absorbing device may include a support beam with a first side and a second side opposite the first side, the first side being configured to be closer to a passenger compartment of a vehicle than the second side. The support beam may define a first aperture extending through the support beam from the first side to the second side. The impact absorbing device may further include an energy absorbing member associated with the second side of the support beam. The energy absorbing member may define a second aperture substantially aligned with the first aperture of the support beam. The first and second apertures may be configured to provide flow communication through the impact absorbing device.

In another aspect, the disclosure relates to an impact absorbing device for a vehicle. The impact absorbing device may include a support beam with a first side and a second side opposite the first side, the first side being configured to be closer to a passenger compartment of a vehicle than the second side. The support beam may define a first aperture extending through the support beam from the first side to the second side. The impact absorbing device may further include an energy absorbing member associated with the second side of the support beam. The energy absorbing member may define a second aperture substantially aligned with the first aperture of the support beam, and may include a plurality of recesses adjacent to the second aperture. The first and second apertures may be configured to provide flow communication through the impact absorbing device.

In yet another aspect, the disclosure relates to a vehicle, which may include a chassis having a front end and a rear end opposite the front end and an impact absorbing device coupled to the front end of the chassis. The impact absorbing device may be configured to at least partially absorb impact with the front end of the vehicle. The impact absorbing device may include a support beam coupled to the front end of the chassis. The support beam may have a first side and a second side opposite the first side. The first side may be closer to the passenger compartment of the vehicle than the second side. The support beam may include a first aperture extending through the support beam from the first side to the second side. The impact absorbing device may also include an energy absorbing member associated with the second side of the support beam. The energy absorbing member may include a second aperture, which may be substantially aligned with the first aperture. The first and second apertures may be configured to provide flow communication through the impact absorbing device to at least one component associated with the chassis.

DETAILED DESCRIPTION

FIGS. 1-4 illustrate exemplary components of impact absorbing devices and exemplary impact absorbing devices. Such impact absorbing devices may be implemented in a vehicle of any type. For example, the vehicle may be a car, truck, semi-truck, motorcycle, plane, train, moped, scooter, or other means of transportation. Furthermore, the vehicle may use any type of powertrains. For example, the vehicle may be an electric vehicle, a fuel cell vehicle, a hybrid vehicle, or a conventional internal combustion engine vehicle.

Figure 1:
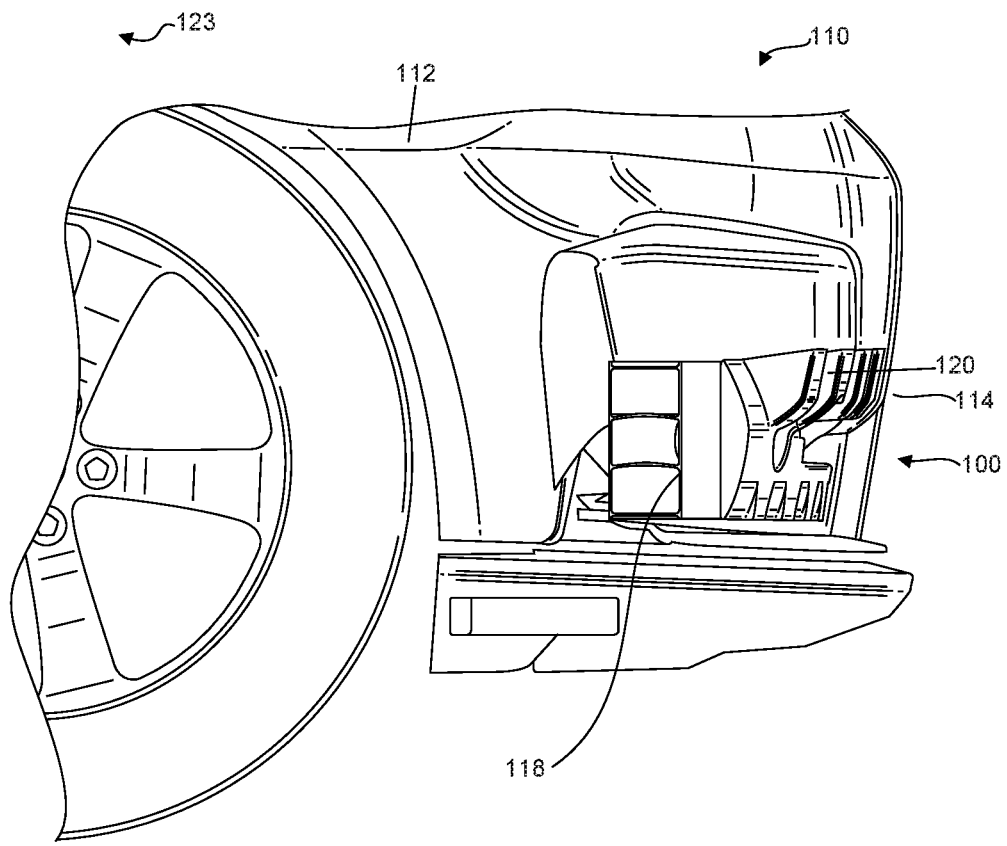
FIG. 1 is a cut away illustration of an exemplary impact absorbing device of a vehicle.

FIG. 1 is a cut away illustration of an exemplary impact absorbing device 100. As depicted in FIG. 1, impact absorbing device 100 may be employed in a vehicle 110. Vehicle 110 may include a chassis 112 and other vehicle components associated with chassis 112, such as a primary power source (for an electric vehicle, a fuel cell vehicle, a hybrid vehicle, or a conventional internal combustion engine vehicle), a vehicle cooling system, a transmission, an oil cooler, a radiator, or other components known in the art (not depicted). Vehicle 110 may further include a grill 114, which may be associated with (e.g., coupled to) a front end 116 of chassis 112.

Impact absorbing device 100 may include a support beam 118 and an energy absorbing member 120. Energy absorbing member 120 may be positioned between support beam 118 and grill 114, such that grill 114 is associated with the side of energy absorbing member 120 that is opposite support beam 118. Support beam 118 and energy absorbing member 120 are described in greater detail in connection with FIGS. 2-4.

Figure 2A:
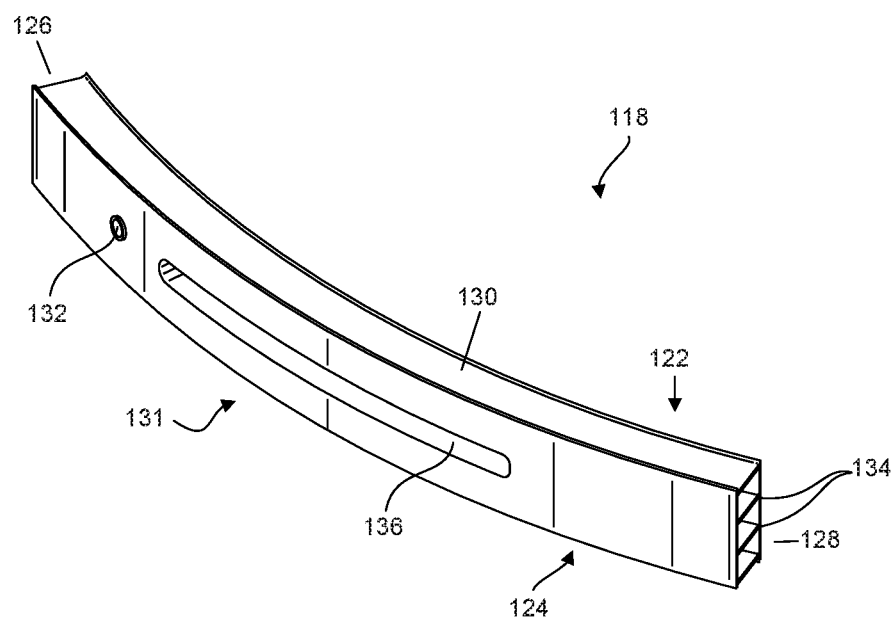
FIG. 2A is a perspective view of an exemplary support beam for an exemplary impact absorbing device.

FIGS. 2A-2E illustrate an exemplary embodiment of support beam 118. FIG. 2A is a perspective view of support beam 118. Support beam 118 may include a first side 122, a second side 124, a first end 126, a second end 128, and a top 130. Support beam 118 may also include a bottom 131 opposite top 130. When coupled to vehicle 110, first side 122 may be positioned closer to a passenger compartment 123 of vehicle 110 than second side 124 of support beam 118 (see FIG. 1).

Support beam 118 may be formed from extruded aluminum, roll-formed aluminum, stamped aluminum, or other suitable materials. Support beam 118 may also be composed of multiple different materials. Support beam 118 may be of any dimensions, and may be straight-sided or may curve between first end 126 and second end 128 and/or between top 130 and bottom 131 of support beam 118.

Support beam 118 may be solid, or may be hollow. In embodiments in which support beam 118 is hollow, support beam 118 may include supporting structures 134, which provide structural support and maintain the spacing between first side 122 and second side 124. Support beam 118 may also include a tow-eye hole 132 configured to receive an eye-bolt to facilitate towing of vehicle 110, and/or other additional features.

Support beam 118 may also include first aperture 136. First aperture 136 may extend through support beam 118 from first side 122 to second side 124. Shown as a single aperture, first aperture 136 may also include multiple apertures disposed in support beam 118. First aperture 136 may be round, square, rectangular, oval, or any other shape. First aperture 136 may also be of any suitable dimensions. If multiple apertures comprise first aperture 136, each may be a different shape and/or may have different dimensions.

Figure 2B:
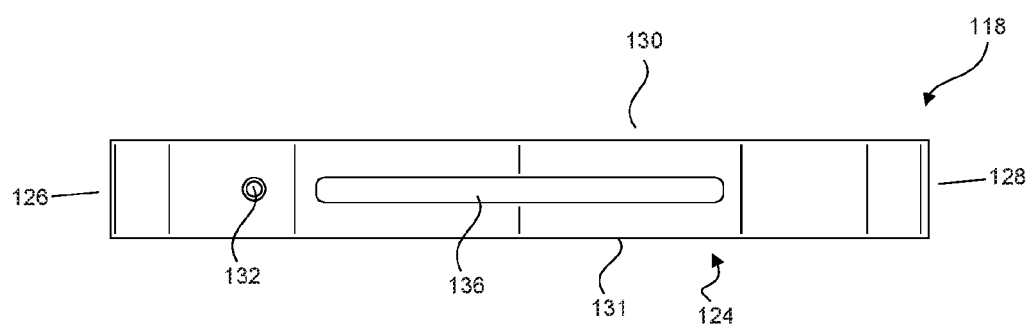
FIG. 2B is a side view of the exemplary support beam shown in FIG. 2A.

FIG. 2B is a side view showing second side 124 of exemplary support beam 118. First aperture 136 is depicted centered on second side 124, but may be at any position.

Figure 2C:
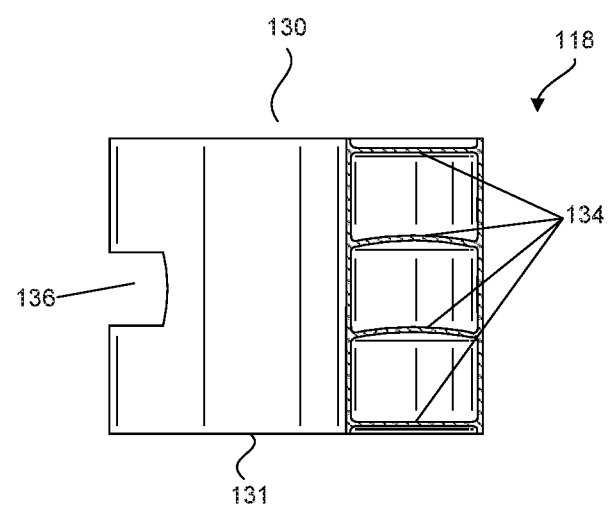
FIG. 2C is a cross-sectional view of the exemplary support beam shown in FIG. 2A.

FIG. 2C is a cross-sectional view of a portion of exemplary support beam 118. FIG. 2C depicts support structures 134. Support structures 134 may be cross pieces transverse (e.g., perpendicular) to first side 122 and/or second side 124, as depicted. It is also contemplated that support structures 134 may form a cross, X, honeycomb, or diamond pattern between sides 122 and 124. It is contemplated that any number of support structures 134 may be used, and that support structures 134 may be composed of the same material as the other portions of support beam 118 or may be composed of a different material.

Figure 2D:
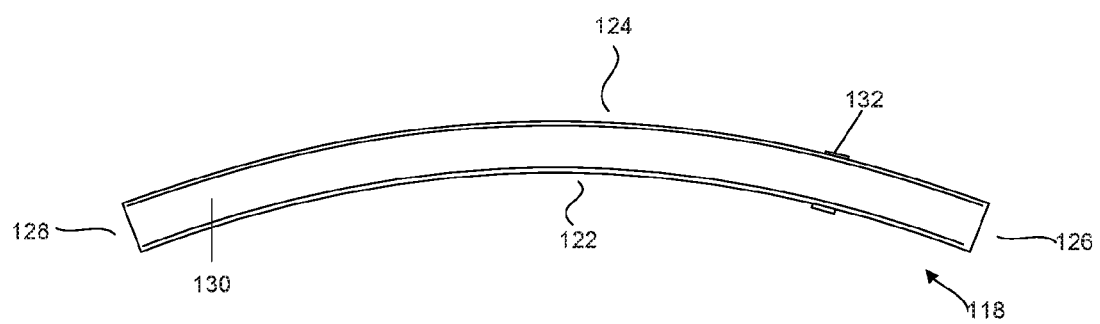
FIG. 2D is a top view of the exemplary support beam shown in FIG. 2A.
Figure 2E:
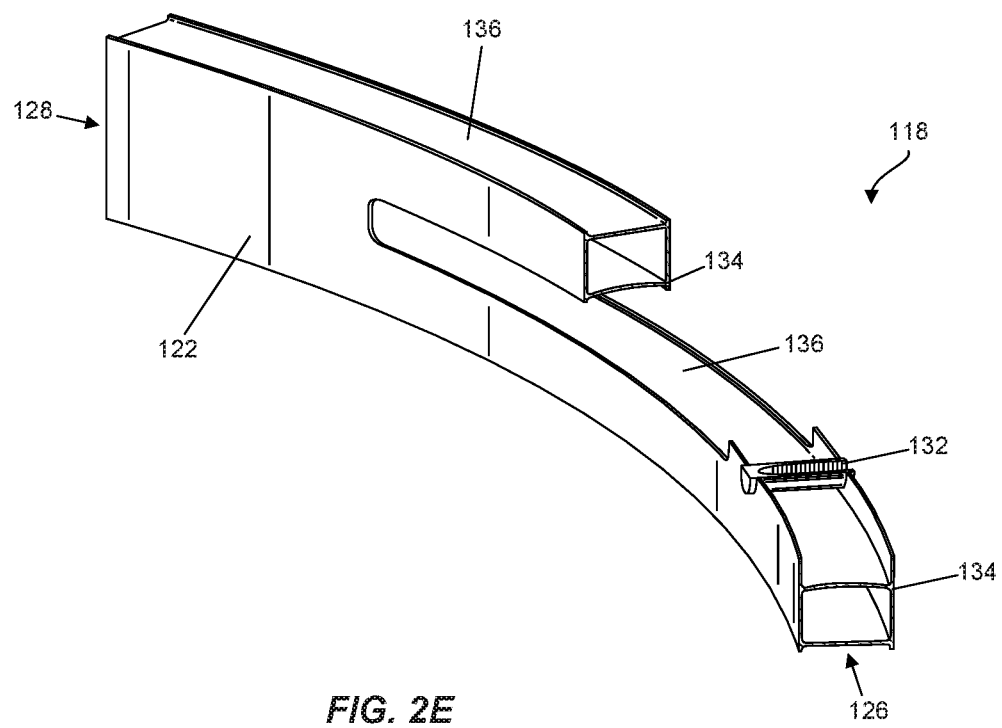
FIG. 2E is a partial section view of the exemplary support beam shown in FIG. 2A.

FIG. 2D is a top view of support beam 118, and FIG. 2E is a cross-sectional view of support beam 118 including top 130. FIG. 2E depicts tow-eye hole 132 in greater detail. Tow-eye hole 132 may include internal threading configured to threadedly engage external threading of a toe-eye hook or cap.

Figure 3A:
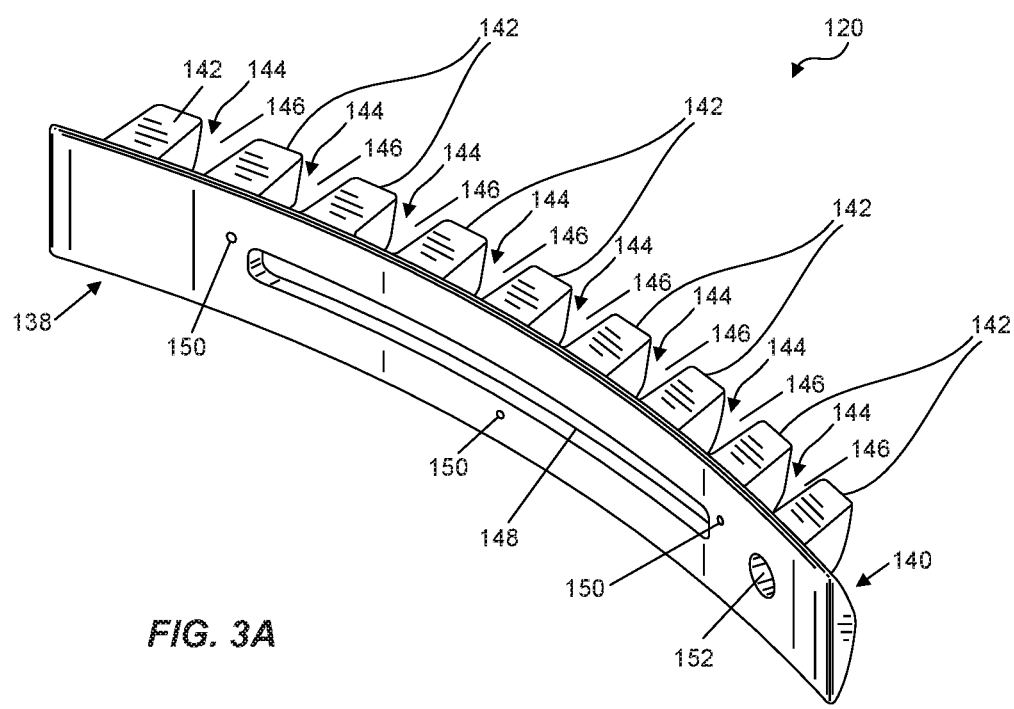
FIG. 3A is a perspective view of an exemplary energy absorbing member for an exemplary impact absorbing device.

FIG. 3A is a perspective view of exemplary energy absorbing member 120. Energy absorbing member 120 may include a first side 138 and a second side 140, which may be opposite side 138. Side 140 may include protrusions 142 and recesses 144, which may define flow passages 146. Support beam 118 may further define second aperture 148, one or more connection points 150, and a toe-eye aperture 152.

Exemplary energy absorbing member 120 may be composed of one or more energy absorbing materials, for example, polypropylene, expanded polypropylene, structural plastic, nylon, glass-fill, natural rubber, and/or synthetic rubber. The composition of energy absorbing member 120 and the dimensions of energy absorbing member 120 may be dictated by structural concerns (such as the weight of the material) and/or by applicable safety regulations. Like support beam 118, energy absorbing member 120 may be straight-sided or may curve from end to end and/or top to bottom.

Figure 3B:
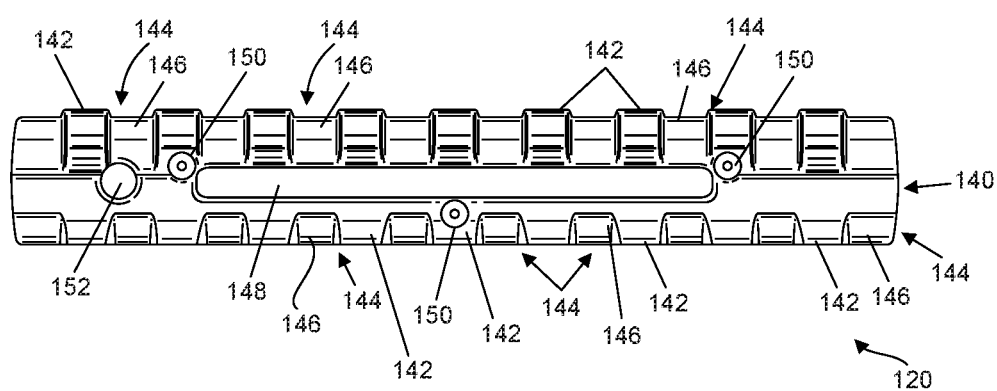
FIG. 3B is a front view of the energy absorbing member shown in FIG. 3A.

FIG. 3B is a front view of side 140 of energy absorbing member 120. FIG. 3B depicts exemplary flow passages 146 in greater detail. Flow passages 146 may be defined by protrusions 142 and recesses 144. Flow passages 146 may be configured to provide flow communication through second aperture 148. Flow passages 146 may be grooved, tapered, flared, slanted, angled, and/or otherwise positioned to optimize air flow through second aperture 148. Exemplary second aperture 148 is depicted in the center of energy absorbing member 120, but may be positioned at any point. Second aperture 148 may be a single aperture, or may be composed of multiple apertures. As with first aperture 136, second aperture 148 may be of any suitable shape and/or any dimensions, and when composed of multiple apertures, at least some of the apertures may be of different shapes and/or dimensions.

Figure 3C:
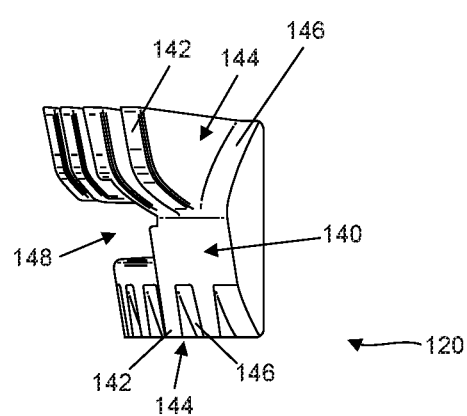
FIG. 3C is a partial section view of a portion of the energy absorbing member shown in FIG. 3A.

FIG. 3C is a partial view of a portion of energy absorbing member 120. FIG. 3C shows exemplary protrusions 142 and exemplary recesses 144 in greater detail. Protrusions 142 and recesses 144 may be of any size and/or dimensions. Though multiple protrusions 142 and recesses 144 are present in the exemplary embodiment depicted, it is contemplated that any number of protrusions 142 and recesses 144 may be used, and that in some cases either or both of protrusions 142 and recesses 144 may be omitted. The number and positioning of protrusions 142 and recesses 144 may be dictated by the positioning of second aperture 148 and/or by the amount of air flow intended to flow through second aperture 148.

Protrusions 142 are shown in FIG. 3A on the top portion of side 140, but may also be positioned on the bottom portion of side 140 (see, e.g., FIG. 3B) (either as an alternative or in addition to protrusions on the top portion of side 140). Both recesses 144 and protrusions 142 may also be on both the top and bottom portions of side 140 of energy absorbing member 120.

Figure 3D:
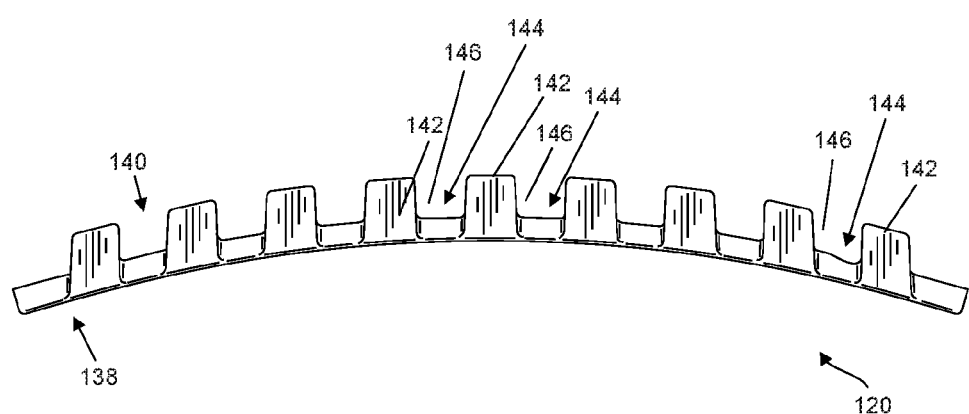
FIG. 3D is a top view of the energy absorbing member shown in FIG. 3A.

Shown in, for example, FIGS. 3C and 3D as peaks (alternating with valleys formed by the space between protrusions 142), protrusions 142 may also be uniform protrusions (such that all parts of protrusion 142 extend to the same height). Protrusions 142 may be rounded or square, and where, as shown, multiple protrusions 142 are used, each protrusion 142 may be of different sizes and dimensions (including height, width, and length). Protrusions 142 may extend from any portion of side 140.

FIG. 3D depicts a top view of exemplary energy absorbing member 120. Protrusions 120 are shown uniformly spaced, but protrusions 142 may also be non-uniformly spaced. Like protrusions 142, recesses 144 may be of uniform shape and/or size, or may be of different shapes and/or sizes. Recesses 144 may be also uniformly or non-uniformly spaced, and may be placed on any portion of side 140.

Figure 3E:
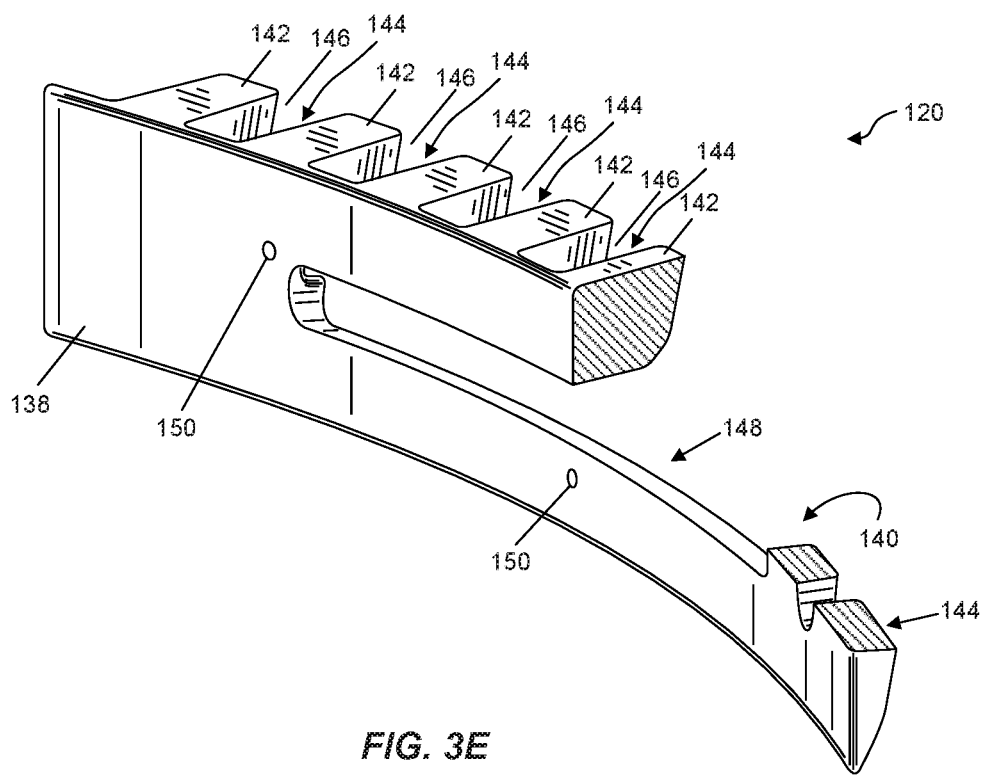
FIG. 3E is a partial section view of the energy absorbing member shown in FIG. 3A.

FIG. 3E shows a partial section view of energy absorbing member 120. Connection points 150, shown on side 138 of energy absorbing member 120, may be used to couple energy absorbing member 120 to support beam 118. Connection points 150 may be used for one or more of push-pin connections, screws, bolts, etc. Alternatively or in addition, adhesive may be used to couple side 138 of energy absorbing member 120 to support beam 118. Three connection points 150 are depicted, but any number of connection points, positioned at any position on support beam 118, may be used. Connection points 150 may also be omitted.

Figure 4:
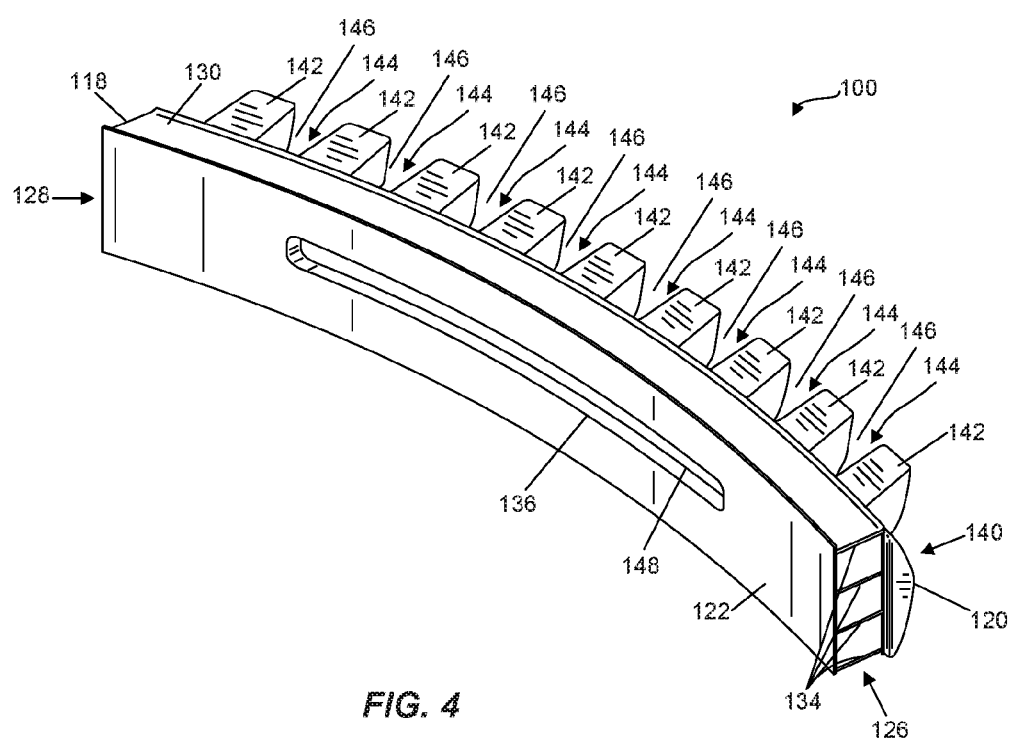
FIG. 4 is a perspective view of an exemplary impact absorbing device.

FIG. 4 depicts exemplary impact absorbing device 100. Impact absorbing device 100 may include support beam 118 and energy absorbing member 120. In the exemplary embodiment shown, support beam 118 and energy absorbing member 120 may nest such that second side 124 of support beam 118 and side 138 of energy absorbing member 120 are adjacent to one another. Support beam 118 and energy absorbing member 120 may be connected via one or more of push-pin connection, screws, bolts, adhesive, etc.

Support beam 118 and energy absorbing member 120 may be positioned so that first aperture 136 and second aperture 148 are substantially aligned. First aperture 136 and second aperture 148 may be of different shapes and/or dimensions and still substantially aligned. For example, first aperture 136 and second aperture 148 may have substantially aligned (e.g., collinear) axes. The alignment of first aperture 136 and second aperture 148 provides flow communication through impact absorbing device 100. If included, toe-eye hole 132 and toe-eye aperture 152 may also be aligned.

When used with vehicle 110, impact absorbing device 100 may be disposed at front end 116 of chassis 112 so that first side 122 of support beam 118 is closer to the passenger compartment 123 of vehicle 110, and side 140 of energy absorbing member 120 is associated with grill 114. Support beam 118 may be connected directly to chassis 112, or may be connected to crush cans.

Energy absorbing member 120 may be connected to grill 114, or may be disposed adjacent to grill 114. Alternatively, grill 114 may be omitted. In either case, energy absorbing member 120 may be disposed adjacent to, or connected to, the fascia of vehicle 110. In some embodiments, there may be space between the fascia of vehicle 110 (or grill 114) and energy absorbing member 120.

In use, first and second apertures 136 and 148 provide flow communication between vehicle components associated with chassis 112 (such as a primary power source (for an electric vehicle, a fuel cell vehicle, a hybrid vehicle, or a conventional internal combustion engine vehicle), a vehicle cooling system, a transmission, an oil cooler, a radiator, or other components known in the art), and the environment. This allows air flow through impact absorbing device 100 to components associated with chassis 112, while still at least partially absorbing impact with front end 116. In some embodiments, air flow may also reach the components associated with chassis 112 using flow paths above and below impact absorbing device 100, while in other embodiments, the flow path created by apertures 136 and 148 may be the only flow communication between the components associated with the chassis and the environment.

Though described with reference to a front-end impact absorbing device, the present disclosure is also applicable to a rear-end impact absorbing device, a side impact absorbing device, etc. Impact absorbing device 100 may be positioned on any portion of vehicle 110.

Impact absorbing device 100 may be implemented both as an integrated part in vehicles and as a separately sold device. For instance, the user (or mechanic) may install a new impact absorbing device in an existing vehicle when replacing existing parts during repairs. Furthermore, particular components of the system (e.g., support beam 118 or energy absorbing member 120) may be separately replaced.

Though described with reference to vehicle components, the disclosure is not limited to use in vehicles. It will be apparent to those skilled in the art that various modifications and variations can be made to the impact absorbing device. Other embodiments will be apparent to those skilled in the art from consideration of the specification and practice of the disclosed impact absorbing device. It is intended that the specification and examples be considered as exemplary only, with a true scope being indicated by the following claims and their equivalents.

What is claimed is:

1. An impact absorbing device for a vehicle, the impact absorbing device comprising:
   a support beam comprising a first side and a second side opposite the first side, the first side being configured to be closer to a passenger compartment of a vehicle than the second side, wherein the support beam defines a first aperture extending through the support beam from the first side to the second side; and
   an energy absorbing member associated with the second side of the support beam, wherein the energy absorbing member defines a second aperture substantially aligned with the first aperture of the support beam and extending through the energy absorbing member from a front side of the energy absorbing member to a back side opposite the front side, the energy absorbing member comprising:
      a plurality of protrusions extending in a first direction from a plane defined by an opening of the second aperture on the front side of the energy absorbing member, and
      a plurality of recesses extending from the plane in a second direction opposite the first direction; wherein
   the protrusions are positioned above the second aperture;
   the recesses are positioned below the second aperture;
   the first and second apertures are configured to provide flow communication through the impact absorbing device; and
   the protrusions at least partially define flow passages configured to provide flow communication with the first aperture of the support beam.

2. The impact absorbing device of claim 1, wherein the support beam comprises at least one of extruded aluminum, roll-formed aluminum, and stamped aluminum.

3. The impact absorbing device of claim 1, wherein the energy absorbing member comprises an energy absorbing material, wherein the energy absorbing material comprises at least one of polypropylene, expanded polypropylene, structural plastic, nylon, glass-fill, natural rubber, and synthetic rubber.

4. The impact absorbing device of claim 1, wherein the support beam and the energy absorbing member are coupled to one another via at least one of adhesives, screws, bolts, and push-pin connectors.

5. The impact absorbing device of claim 1, wherein the energy absorbing member is curved between first and second ends of the energy absorbing member, wherein the support beam is curved between first and second ends of the support beam, and wherein the support beam nests with the energy absorbing member.

6. A vehicle comprising:
   a chassis having a front end and a rear end opposite the front end; and
   an impact absorbing device coupled to the front end of the chassis and configured to at least partially absorb impact with a front end of the vehicle, the impact absorbing device comprising:
      a support beam coupled to the front end of the chassis and comprising a first side and a second side opposite the first side, the first side being closer to a passenger compartment of the vehicle than the second side, and the support beam defining a first aperture extending through the support beam from the first side to the second side; and
      an energy absorbing member associated with the second side of the support beam, the energy absorbing member defining a second aperture substantially aligned with the first aperture of the support beam and extending through the energy absorbing member from a front side of the energy absorbing member to a back side opposite the front side, the energy absorbing member comprising:
         a plurality of protrusions extending in a first direction from a plane defined by an opening of the second aperture on the front side of the energy absorbing member, and
         a plurality of recesses extending from the plane in a second direction opposite the first direction;
      wherein
      the protrusions are positioned above the second aperture;
      the recesses are positioned below the second aperture;
      the first and second apertures are configured to provide flow communication through the impact absorbing device to at least one component associated with the chassis; and
      the protrusions at least partially define flow passages configured to provide flow communication with the first aperture of the support beam.

7. The vehicle of claim 6, further comprising a grill associated with the energy absorbing member on the front side of the energy absorbing member, wherein the front side is opposite the second side of the support beam, and wherein the grill, support beam, and energy absorbing member are configured such that flow communication is provided through the grill, the second aperture of the energy absorbing member, and the first aperture of the support beam to the at least one component associated with the chassis.

8. The vehicle of claim 6, wherein the support beam comprises at least one of extruded aluminum, roll-formed aluminum, and stamped aluminum.

9. The vehicle of claim 6, wherein the energy absorbing member comprises an energy absorbing material, wherein the energy absorbing material comprises at least one of polypropylene, expanded polypropylene, structural plastic, nylon, glass-fill, natural rubber, and synthetic rubber.

10. The vehicle of claim 6, wherein the support beam and the energy absorbing member are coupled to one another via at least one of adhesives, screws, bolts, and push-pin connectors.

11. The vehicle of claim 6, wherein the energy absorbing member is curved between first and second ends of the energy absorbing member, wherein the support beam is curved between first and second ends of the support beam, and wherein the support beam nests with the energy absorbing member.

* * * * *